(12) United States Patent
Sehsah et al.

(10) Patent No.: US 10,596,496 B2
(45) Date of Patent: *Mar. 24, 2020

(54) SYSTEMS AND METHODS COMPRISING SMART AUTO CLEANING PIPE SCREEN FOR DRILLING OPERATIONS

(71) Applicant: Saudi Arabian Oil Company, Dhahran (SA)

(72) Inventors: Ossama Sehsah, Dhahran (SA); Victor Carlos Costa de Oliveira, Dhahran (SA); Mario Augusto Rivas Martinez, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 302 days.

This patent is subject to a terminal disclaimer.

(21) Appl. No.: 15/788,270

(22) Filed: Oct. 19, 2017

(65) Prior Publication Data

US 2019/0118122 A1 Apr. 25, 2019

(51) Int. Cl.
| | |
|---|---|
| *B01D 29/60* | (2006.01) |
| *E21B 21/06* | (2006.01) |
| *B01D 21/28* | (2006.01) |
| *B01D 29/01* | (2006.01) |
| *B01D 35/02* | (2006.01) |
| *B01D 35/26* | (2006.01) |
| *G05D 7/06* | (2006.01) |

(52) U.S. Cl.
CPC ......... *B01D 29/606* (2013.01); *B01D 21/283* (2013.01); *B01D 29/01* (2013.01); *B01D 35/02* (2013.01); *B01D 35/26* (2013.01); *E21B 21/065* (2013.01); *G05D 7/0641* (2013.01)

(58) Field of Classification Search
CPC ...... E21B 21/065; E21B 21/06; E21B 21/063; E21B 21/08; E21B 21/10; E21B 21/106; E21B 43/34; E21B 43/40; C02F 2209/005; C02F 2209/10; B01D 2221/04; B01D 2313/083; B01D 2317/04; B01D 29/52; B01D 21/0009; B01D 21/283; B01D 21/302; B01D 2259/80; B01D 2259/814; B01D 2311/2607; B01D 2311/2615; B01D 35/02
See application file for complete search history.

(56) References Cited

U.S. PATENT DOCUMENTS

| | | |
|---|---|---|
| 5,362,962 A | 11/1994 | Barborak et al. |
| 5,741,416 A | 4/1998 | Tempest, Jr. |
| (Continued) | | |

OTHER PUBLICATIONS

International Search Report and Written Opinion for related PCT application PCT/US2018/056620 (SA5749) dated Feb. 18, 2019; pp. 1-15.

*Primary Examiner* — Pranav N Patel
(74) *Attorney, Agent, or Firm* — Bracewell LLP; Constance G. Rhebergen; Vivek P. Shankam (57) ABSTRACT

An auto cleaning system for cleaning a drilling fluid in a drilling operation, includes a controller configured to determine the difference between a pressure reading by a first pressure sensor and a second pressure sensor is above a predetermined threshold value, and at least partially open an entrance valve on a second line to divert drilling fluid intake from a first line to the second line, and close the entrance valve on the first line to stop the drilling fluid from entering the first line.

20 Claims, 3 Drawing Sheets

(56) References Cited

U.S. PATENT DOCUMENTS

| | | |
|---|---|---|
| 6,557,630 B2 | 5/2003 | Harkins et al. |
| 6,609,573 B1 | 8/2003 | Day |
| 7,096,961 B2 | 8/2006 | Clark et al. |
| 8,127,867 B1 | 3/2012 | Droke |
| 8,236,182 B2 | 8/2012 | Lehman et al. |
| 8,528,665 B2 | 9/2013 | Jackson et al. |
| 9,194,216 B2 | 11/2015 | Lucas et al. |
| 2004/0256157 A1 | 12/2004 | Tessari et al. |
| 2007/0017674 A1 | 1/2007 | Blaisdell |
| 2007/0221413 A1 | 9/2007 | Sims et al. |
| 2011/0186523 A1* | 8/2011 | Williamson ............... B03C 1/30 210/695 |
| 2011/0198080 A1 | 8/2011 | Demong |
| 2013/0193072 A1 | 8/2013 | Booth |
| 2015/0048033 A1 | 2/2015 | Burns et al. |
| 2016/0097247 A1 | 4/2016 | Marco et al. |

\* cited by examiner

SYSTEMS AND METHODS COMPRISING SMART AUTO CLEANING PIPE SCREEN FOR DRILLING OPERATIONS

TECHNICAL FIELD

Example embodiments generally relate to automation in drilling operations, and more specifically relate to methods and systems for auto cleaning the drilling fluid in a drilling operation.

BACKGROUND

In the oil and gas industry, downhole drilling operations may drill boreholes that extend thousands of feet into the ground. A fluid called drilling mud is used to facilitate drilling. Drilling mud circulates through the drilling system. Mud pumps are used to pump the drilling mud from mud tanks located at the surface. The mud gets pumped through a kelly hose and a top drive. The mud is further pumped through the drill string, or drill pipe, to the bottom hole assembly. As it reaches the bottom of the borehole, the mud acts to cool and clean the drill bit. The mud also picks up rock formation cuttings and circulates them back up through an annulus between the drill string and casing back through the blowout preventers to the surface. At this point, the mud gets processed through a shale shaker before returning to mud tanks to start the process of being pumped downhole again.

As the mud circulates through this system, it may pick up significant amounts of debris, which can affect the flow of the mud and the operation of the drill bit and other tools. A filter screen subassembly may be installed in the drill string to help collect and filter debris. Downhole filter screens are often run during directional drilling and are typically installed near the drill bit at the top of the bottom hole assembly (BHA), and thus are not easily accessible during drilling. To remove or clean out a downhole filter screen, the entire drill string must be pulled out of the wellbore. Downhole filter screens typically employ flanges to be secured in a section of drill string. The flanges necessitate the insertion and removal of the existing filter screens from the box end (i.e., uppermost end) of a drill string section.

Additionally, downhole filter screens are easily damaged during drilling operations. If a filter screen fills with debris and is not properly maintained or cleaned, then it can cause blockages in the fluid flow or potentially "wash out." In other words, the filter screen may shear off due to excess debris buildup or excess vibration during drilling operations. The broken filter screen can be pushed by the fluid flow of the drilling mud and may end up at the bottom of the borehole, and damage the bottom hole equipment. Due to the inconveniences from factors such as installation, cleaning, and maintenance, filter screens are often not used by drilling operators despite the benefits they provide in filtering drilling mud.

Surface pipe screens are also sometimes used to filter drilling mud. These pipe screens are installed in the drill string above the surface at the drilling rig, and they are designed to catch finer particulates than downhole filter screens. However, they are typically not built as robustly as downhole filter screens and require constant maintenance. They are typically installed at the box end of a pipe segment and are held in place using a flange. Surface pipe screens also require constant maintenance. Each time a new drill pipe segment is ready to be added to the drill string, the top drive must be disconnected from the drill string. Before connecting the new drill pipe segment, the installed surface pipe screen must be removed from the topmost exposed segment (i.e., box end) of drill pipe in the drill string. After the new drill pipe segment is connected to the drill string, the surface pipe screen can be reinstalled into the new drill pipe segment's box end, and the top drive can be reconnected with the drill string. If the surface pipe screen is ever forgotten when adding new segments of pipe, the surface pipe screen may become "lost" in the drill string, making its retrieval difficult and tedious. Further, if a surface pipe screen ever shears off, it may become lodged along with debris anywhere in the drill string.

SUMMARY

Accordingly, there exists a need for automation in this area of the drilling operation, and more specifically for an auto cleaning mechanism for regularly cleaning the drilling fluid in a drilling operation.

One example embodiment is an auto cleaning system for cleaning a drilling fluid in a drilling operation. The auto cleaning system includes a first line including a first entrance valve configured to allow the drilling fluid to flow into the first line, a first pressure sensor configured to measure a first pressure of the drilling fluid in the first line at an entrance point, a second pressure sensor configured to measure a second pressure of the drilling fluid in the first line at an exit point, and a first auto clean valve configured to allow the drilling fluid to flow out of the first line. The auto cleaning system further includes a second line including a second entrance valve configured to allow the drilling fluid to flow into the second line, and a second auto clean valve configured to allow the drilling fluid to flow out of the second line. The auto cleaning system further includes an auto clean pump operatively connected to the first auto clean valve and the second auto clean valve via an auto clean line, the auto clean pump configured to receive the drilling fluid from the first line or the second line and remove unwanted material from the drilling fluid. The auto cleaning system further includes a controller operatively connected at least to the first entrance valve, the first pressure sensor, the second pressure sensor, the first auto clean valve, the second entrance valve, the second auto clean valve, and the auto clean pump, wherein the controller is configured to determine the difference between the second pressure and the first pressure is above a predetermined threshold value, at least partially open the second entrance valve to divert drilling fluid intake from the first line to the second line, and close the first entrance valve to stop the drilling fluid from entering the first line.

The controller may be further configured to at least partially open the first auto clean valve to divert the drilling fluid in the first line to the auto clean pump for removal of unwanted material from the filter screen. The auto cleaning system further includes a third line including two or more valves configured to control flow of the drilling fluid into and out of the third line, and two or more auto clean valve configured to allow the drilling fluid to flow out of the third line, wherein the auto clean pump is operatively connected to the two or more auto clean valves via an auto clean line, the auto clean pump configured to receive the drilling fluid from the third line and remove unwanted material from the drilling fluid. The second line further includes a third pressure sensor configured to measure a third pressure of the drilling fluid in the second line at an entrance point, and a fourth pressure sensor configured to measure a fourth pressure of the drilling fluid in the second line at an exit point, wherein the controller is operatively connected to the third pressure sensor, the fourth pressure sensor, the two or more valves of the third line, wherein the controller is configured to determine the difference between the third pressure and the fourth pressure is above the predetermined threshold value, at least partially open an entrance valve of the third line to divert drilling fluid intake from the second line to the third line, and close the second entrance valve to stop the drilling fluid from entering the second line.

Another example embodiment is a method for cleaning a drilling fluid in a drilling operation using an auto cleaning system. The method includes measuring, by a first pressure sensor installed on a first line, a first pressure of the drilling fluid at a first point. The method also includes measuring, by a second pressure sensor installed on the first line, a second pressure of the drilling fluid at a second point, the first line having a first entrance valve configured to allow the drilling fluid to flow into the first line, and a first auto clean valve configured to allow the drilling fluid to flow out of the first line. The method also includes determining, by a controller operatively connected to the first pressure sensor, the second pressure sensor, the first entrance valve, and the first auto clean valve, that a difference between the second pressure and the first pressure is above a predetermined threshold value, at least partially opening a second entrance valve configured to allow the drilling fluid to flow into a second line, and closing, by the controller, the first entrance valve to stop the drilling fluid from entering the first line. The method also includes the controller at least partially opening the first auto clean valve to divert the drilling fluid in the first line to an auto clean pump operatively connected to the first auto clean valve via an auto clean line for removal of unwanted material from the drilling fluid. The method also includes receiving, by the auto clean pump, the drilling fluid from the first line to remove unwanted material from the drilling fluid.

Another example embodiment is an auto cleaning system for cleaning a drilling fluid in a drilling operation. The system includes a first line including a first entrance valve configured to allow the drilling fluid to flow into the first line, a first pressure sensor configured to measure a first pressure of the drilling fluid in the first line at a first point, a second pressure sensor configured to measure a second pressure of the drilling fluid in the first line at a second point, and a first auto clean valve configured to allow the drilling fluid to flow out of the first line. The system also includes a second line including a second entrance valve configured to allow the drilling fluid to flow into the second line, and a second auto clean valve configured to allow the drilling fluid to flow out of the second line. The system also includes an auto clean pump operatively connected to the first auto clean valve and the second auto clean valve via an auto clean line, the auto clean pump configured to receive the drilling fluid from the first line or the second line and remove unwanted material from the drilling fluid. The system also includes a controller operatively connected at least to the first entrance valve, the first pressure sensor, the second pressure sensor, the first auto clean valve, the second entrance valve, the second auto clean valve, and the auto clean pump, wherein the controller is configured to determine the difference between the second pressure and the first pressure is above a predetermined threshold value, at least partially open the second entrance valve to divert drilling fluid intake from the first line to the second line, and close the first entrance valve to stop the drilling fluid from entering the first line. The controller may be further configured to at least partially open the first auto clean valve to divert the drilling fluid in the first line to the auto clean pump for removal of unwanted material from the drilling fluid.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION

The methods and systems of the present disclosure may now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure may be thorough and complete, and may fully convey its scope to those skilled in the art. Like numbers refer to like elements throughout.

Figure 1:
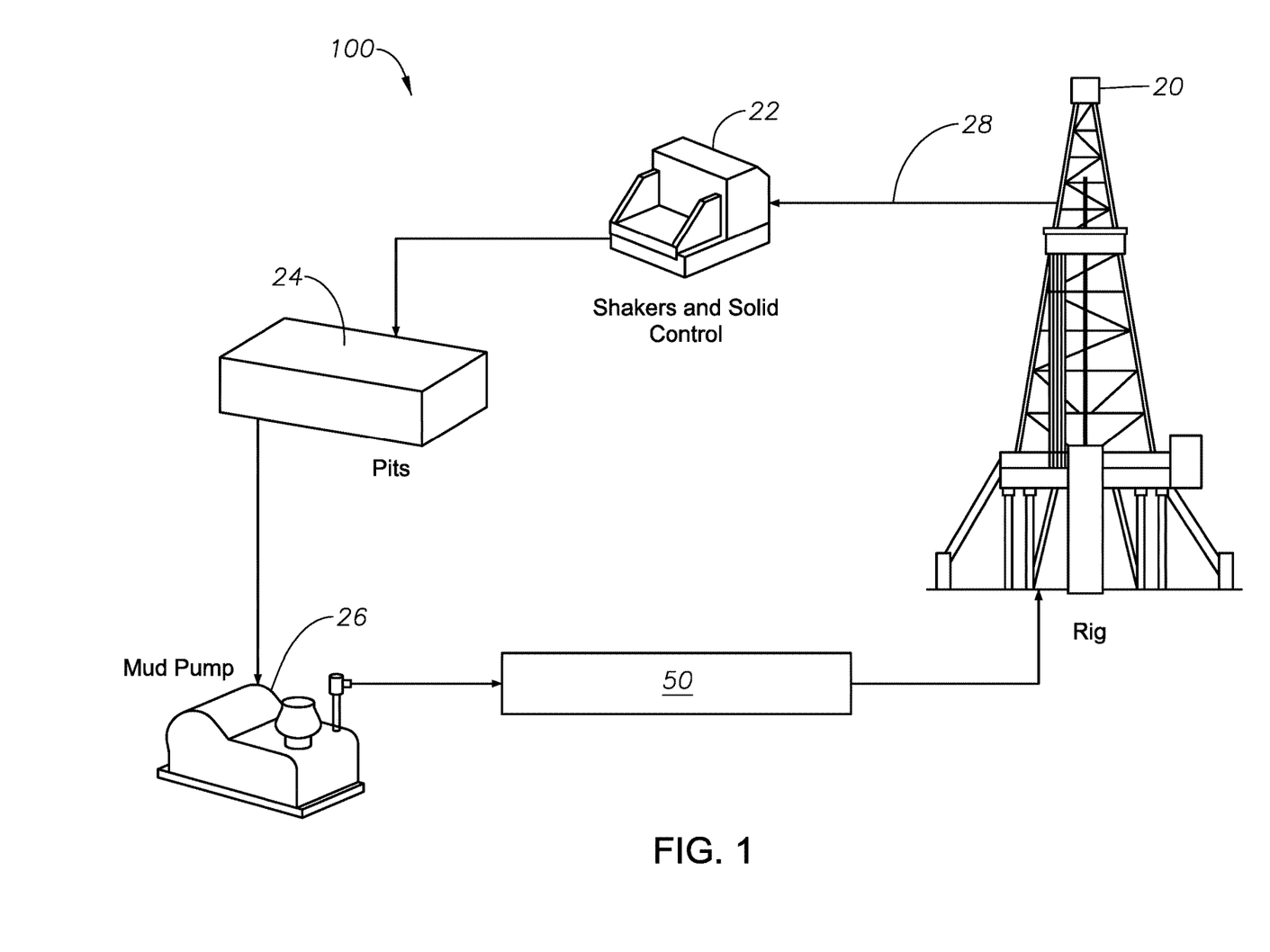
FIG. 1 is a schematic of a drilling rig with an example auto cleaning system for cleaning a drilling fluid in a drilling operation, according to one or more example embodiments of the disclosure.

Turning now to the figures, FIG. 1 is a schematic of a drilling rig 100 with an example auto cleaning system 50 for cleaning a drilling fluid in a drilling operation, according to one or more example embodiments of the disclosure. During the drilling operation, the drilling fluid or drilling mud may circulate from stand pipe 20 to shakers 22, from shakers 22 to mud pit 24, from mud pit 24 to mud pump 26, and from mud pump 26 back to the stand pipe or rig 20. As illustrated in this figure, the auto cleaning system 50 can be installed between the mud pump 26 and stand pipe 20 of the drilling rig, or between the mud pits 24 and mud pump 26, for example. Each of the drilling equipment may be interconnected via a pipe line 28 that may transport the drilling fluid for performing the drilling operation.

Figure 2:
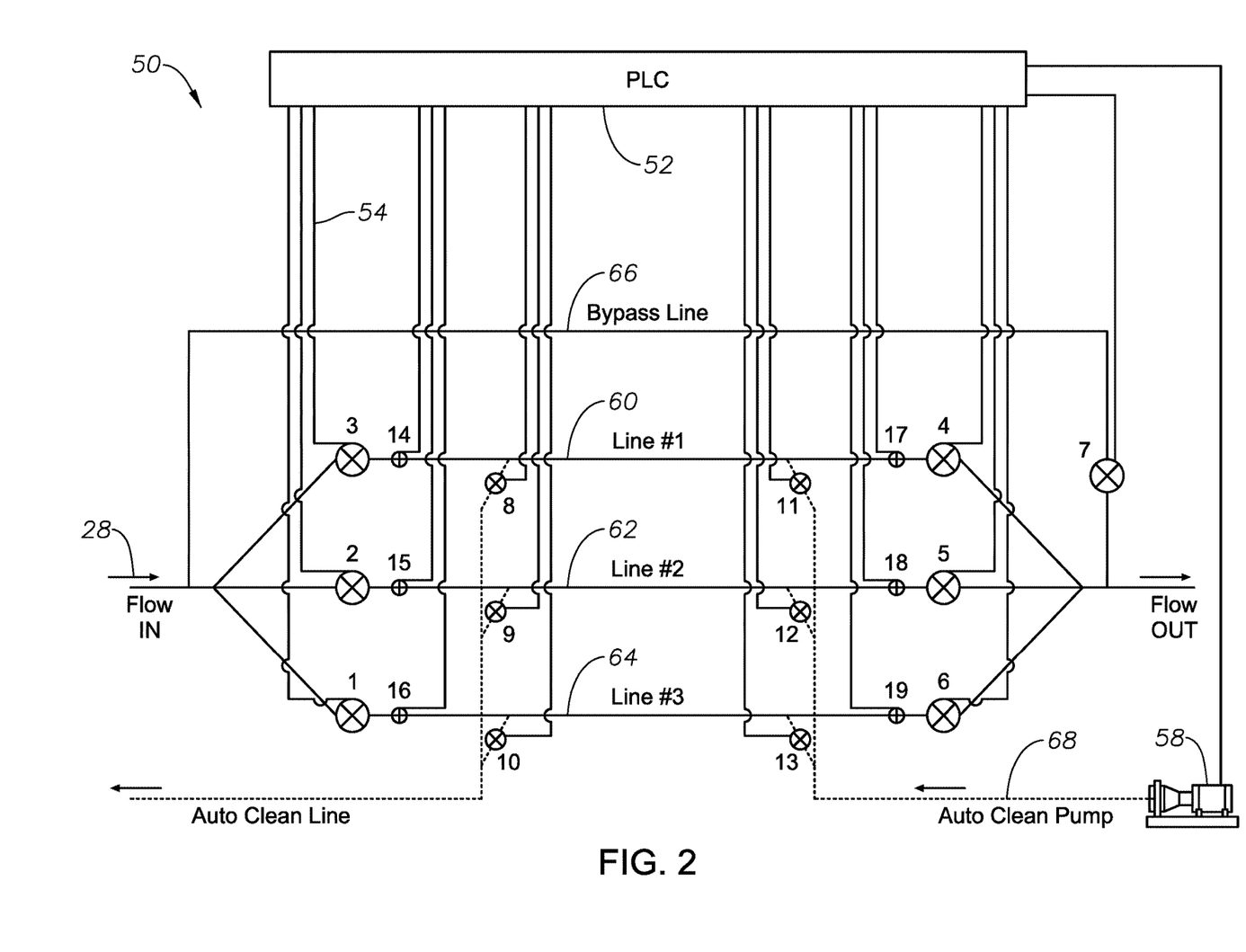
FIG. 2 illustrates an example auto cleaning system for cleaning a drilling fluid in a drilling operation, according to one or more example embodiments of the disclosure.

FIG. 2 illustrates the auto cleaning system 50 according to one or more example embodiments of the disclosure in further detail. The system 50 may include the three main lines 60, 62, and 64, and a bypass line 66. Each of the lines 60, 62, 64, 66 may be equipped with one or more high closing ratio (HCR) valves to control the flow of the drilling fluid into and out of the respective lines. For example, line 60 may have an entrance valve 3 and an exit valve 4. Similarly, line 62 may have an entrance valve 2 and an exit valve 5. Similarly, line 64 may have an entrance valve 1 and an exit valve 6. The bypass line 66 may be equipped with a valve 7 to control the flow of drilling fluid in this line 66.

Main lines 60, 62, 64 may also be equipped with one or more pressure gauges or sensors 14-19 to measure pressure of the drilling fluid in each of these lines at different locations. For example, pressure sensor 14 can measure the pressure of the drilling fluid at the entrance in line 60, and pressure sensor 17 can measure the pressure of the drilling fluid at the exit on line 60. Similarly, pressure sensor 15 can measure the pressure of the drilling fluid at the entrance in line 62, and pressure sensor 18 can measure the pressure of the drilling fluid at the exit on line 62. Similarly, pressure sensor 16 can measure the pressure of the drilling fluid at the entrance in line 64, and pressure sensor 19 can measure the pressure of the drilling fluid at the exit on line 64. Pressure sensors 14-19 act as a transducer and generate a signal as a function of the pressure imposed. Pressure sensors 14-19 can include any type of pressure sensor, including but not limited to, absolute pressure sensor, gauge pressure sensor, vacuum pressure sensor, differential pressure sensor, and a sealed pressure sensor. The transducer within the pressure sensor may include a piezoresistive strain gauge, capacitive sensor, electromagnetic sensor, optical sensor, potentiometric sensor, resonant sensor, thermal sensor, or an ionization sensor.

Main lines 60, 62, 64 can also be connected to an auto cleaning pump 58 via an auto cleaning line 68. Each of the main lines 60, 62, 64 can be equipped with one or more auto clean valves 8-13 to control flow of the drilling fluid out of the respective lines. For example, main line 60 may be equipped with an auto clean valve 8 at the entrance of the line and an auto clean valve 11 at the exit of the line 60. Similarly, main line 62 may be equipped with an auto clean valve 9 at the entrance of the line and an auto clean valve 12 at the exit of the line 62. Similarly, main line 64 may be equipped with an auto clean valve 10 at the entrance of the line and an auto clean valve 13 at the exit of the line 64. Each of these valves may allow the drilling fluid to exit the respective lines and enter the auto clean line 68 for suction to the auto clean pump 58. Auto cleaning pump 58 may be configured to receive the drilling mud and remove any unwanted materials from it. The unwanted materials may include debris and/or formation pebbles that may affect the performance of the drilling operation.

Valves 1-7, auto clean valves 8-13, pressure gauges or sensors 14-19, and the auto cleaning pump 58 may all be operatively connected to a controller 52 via lines 54 for controlling an operation thereof. The controller 52 may be a programmable logic controller (PLC) or programmable controller 52 that may include a digital computer or one or more processors. Controller 52 may be designed for multiple arrangements of digital and analog inputs and outputs, extended temperature ranges, immunity to electrical noise, and resistance to vibration and impact. According to one example embodiment, programs to control machine operation may be typically stored in a battery-backed-up or non-volatile memory. Controller 52 can be programmed in a variety of ways, from the relay-derived ladder logic to programming languages such as specially adapted dialects of BASIC and C. Another example method is state logic, a very high-level programming language designed to program PLCs based on state transition diagrams.

In one example embodiment, line 60 may be active and the system 50 automatically keeps valves 3 and 4 open. In this case, valves 1, 2, 5, 6, 7, 8 and 11 may be closed, so the flow may pass throughout the line 60. However, when the controller 52 determines that the pressure difference in pressure reading between sensor 14 and sensor 17 is greater than a predetermined threshold value, it causes the system to switch from line 60 to line 62. In doing so the controller 52 causes to at least partially open valves 2 and 5, and valves 1, 3, 4, 6, 7, 9 and 12 may be closed so the flow may pass throughout line 62. In one example embodiment, line 60 can be flushed by automatically closing valves 3, 4, 9, 10, 12 and 13, and opening valves 8 and 11, and auto clean pump is turned ON so the pipe filter inside line 60 can be cleaned automatically.

In a further example, when the controller 52 determines that the pressure difference in pressure reading between sensor 15 and sensor 18 is greater than the predetermined threshold value, it causes the system to switch from line 62 to line 64. In doing so the controller 52 causes to at least partially open valves 1 and 6, and valves 2, 3, 4, 5, 7, 10 and 13 may be closed so the flow may pass throughout line 64. In one embodiment, for flushing line 62, valves 2, 5, 8, 10, 11 and 13 may be automatically closed, and valves 9 and 12 may be open, and auto clean pump may be ON so the pipe filter inside line 62 can be cleaned automatically.

In a further example, when the controller 52 determines that the pressure difference in pressure reading between sensor 16 and sensor 19 is greater than a predetermined threshold value, it causes the system to switch from line 64 back to line 60. In doing so the controller 52 causes to at least partially to open valves 3 and 4, and valves 1, 2, 5, 6, 7, 8 and 11 may be closed so that the flow may pass throughout line 60. Similarly, for flushing line 64, valves 1, 6, 8, 9, 11 and 12 may be automatically closed, valves 10 and 13 may be open, and auto clean pump may be ON so the pipe filter inside line 64 can be cleaned automatically. Although the above examples illustrate transition of the drilling fluid from line 60 to line 62, line 62 to line 64, and line 64 to 60, this transition is for illustrative purposes only. The actual order of transition may vary depending on the availability of the lines, i.e. whether or not a particular line is completely flushed out. If none of the lines 60-64 are being used by the system, then bypass line 66 can be activated by closing valves 1, 2, 3, 4, 5 and 6, and opening valve 7 so the flow can be directed straight to line 66.

As illustrated in FIG. 2, the auto cleaning system 50, according to one example embodiment, includes a system of three pipe screens located at three independent lines, and may be located between a mud pump and a stand pipe. The system 50 may be electronically monitored using individual pressure monitoring, and the mud may pass through one line each time, and another two lines work as a backup. The system may be able to deliver clear information to the driller when changing the filter screen due to the pressure gauges installed in each line, and information can be delivered to the rig floor via a monitor control (providing real time logs), for example. The auto cleaning system 50 described uses a closed loop system without exposing the rig crew to any metal pieces coming out of the hole. The system 50 may be able to collect the sample in real time while drilling without having to stop the drilling operation.

System 50 may be installed between a mud pump and a stand pipe, and can help prevent directional drilling tools from getting plugged or damaged by debris or formation pebbles. Signals can be sent to a PLC 52 with a monitor or human machine interface (HMI) to analyze and alarm, and also can operate an actuated valve to switch/divert the suction intake to a backup suction until fixing the problem.

Accordingly, one example embodiment is an auto cleaning system 50 for cleaning a drilling fluid in a drilling operation. The auto cleaning system 50 includes a first line 60 including a first entrance valve 3 configured to allow the drilling fluid to flow into the first line 60, a first pressure sensor 14 configured to measure a first pressure of the drilling fluid in the first line 60 at an entrance point, a second pressure sensor 17 configured to measure a second pressure of the drilling fluid in the first line 60 at an exit point, and a first auto clean valve 8 configured to allow the drilling fluid to flow out of the first line 60. The auto cleaning system 50 further includes a second line 62 including a second entrance valve 2 configured to allow the drilling fluid to flow into the second line 62, and a second auto clean valve 9 configured to allow the drilling fluid to flow out of the second line 62. The auto cleaning system 50 further includes an auto clean pump 58 operatively connected to the first auto clean valve 8 and the second auto clean valve 9 via an auto clean line 68. The auto clean pump 58 is configured to receive the drilling fluid from the first line 60 or the second line 62 and remove unwanted material from the drilling fluid. The auto cleaning system 50 further includes a controller 52 operatively connected at least to the first entrance valve 3, the first pressure sensor 14, the second pressure sensor 17, the first auto clean valve 8, the second entrance valve 2, the second auto clean valve 9, and the auto clean pump 58. The controller 58 may be configured to determine the difference between the second pressure and the first pressure is above a predetermined threshold value, at least partially open the second entrance valve 2 to divert drilling fluid intake from the first line 60 to the second line 62, and close the first entrance valve 3 and exit valve 4 to stop the drilling fluid from entering the first line 60. The controller may be further configured to at least partially open the auto clean valves 11 and 8 to divert the drilling fluid in the first line 60 to the auto clean pump 58 for removal of unwanted material from the drilling fluid. When this occurs, the fluid flows from valve 11 and goes to valve 8, thereby flushing the line 60 backwards. This is also applicable to other valves that may be connected to auto clean pump 58.

The auto cleaning system 50 further includes a third line 64 including two or more valves 1, 6 configured to control flow of the drilling fluid into and out of the third line 64, and two or more auto clean valves 10, 13 configured to allow the drilling fluid to flow out of the third line 64. The auto clean pump 58 may be operatively connected to the two or more auto clean valves 10, 13 via an auto clean line 68, and may be configured to receive the drilling fluid from the third line 64 and remove unwanted material from the drilling fluid. The second line 62 may further include a third pressure sensor 15 configured to measure a third pressure of the drilling fluid in the second line 62 at an entrance point, and a fourth pressure sensor 18 configured to measure a fourth pressure of the drilling fluid in the second line 62 at an exit point. The controller 52 may be operatively connected to the third pressure sensor 15, the fourth pressure sensor 18, and the two or more valves 1, 6 of the third line. Controller 52 may be configured to determine the difference between the third pressure and the fourth pressure is above the predetermined threshold value, at least partially open an entrance valve 1 of the third line 64 to divert drilling fluid intake from the second line 62 to the third line 64, and close the second entrance valve 2 to stop the drilling fluid from entering the second line 62.

In one example embodiment, the auto cleaning system 50 can also include a human machine interface (not shown) that may be connected to the controller 52 for displaying an alert message and receiving an instruction from an operator. The controller 52 may activate or deactivate any of the valves 1-13 based on an input received form the operator. The phrase "at least partially opening the valve" refers to the operation of at least partially opening the valve. For example, a valve may be partially open or completely open at a certain point in time. As described herein, the phrase "at least partially open" covers both scenarios where a valve may be partially or fully open.

Figure 3:
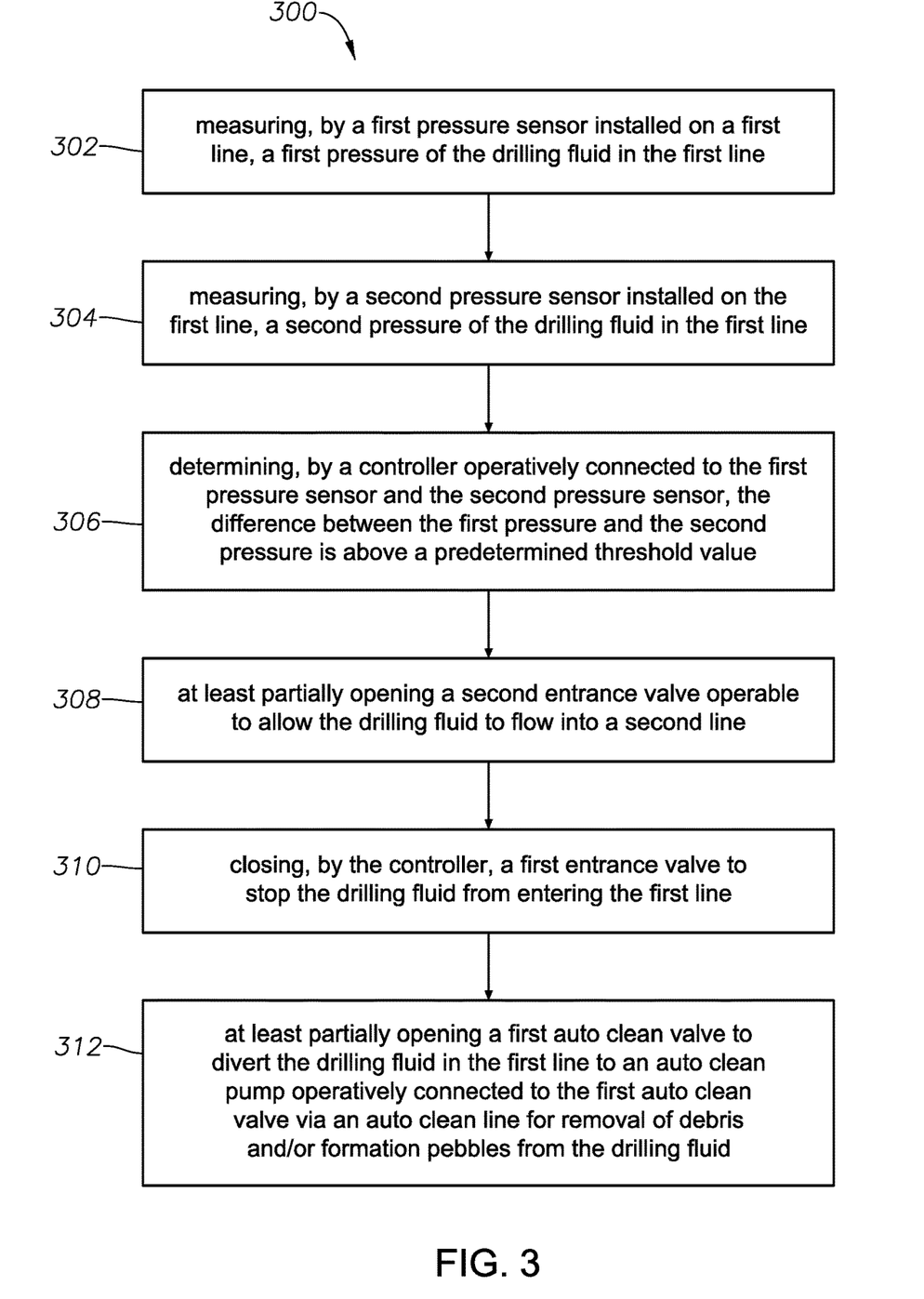
FIG. 3 illustrates example operations in a method for auto cleaning a drilling fluid in a drilling operation, according to one or more example embodiments of the disclosure.

FIG. 3 illustrates example operations in a method 300 for auto cleaning a drilling fluid in a drilling operation, according to one or more example embodiments of the disclosure. For purposes of simplicity of explanation, the example method disclosed herein is presented and described as a series of blocks (with each block representing an action or an operation in a method, for example). However, it is to be understood and appreciated that the disclosed method is not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

The method 300 includes at step 302, measuring, by a first pressure sensor installed on a first line, a first pressure of the drilling fluid at a first point. The first point can be, for example, an entrance point on the first line. The method further includes at step 304, measuring, by a second pressure sensor installed on the first line, a second pressure of the drilling fluid at a second point. The second point can be, for example, and exit point on the first line. The first line may include a first entrance valve configured to allow the drilling fluid to flow into the first line, and a first auto clean valve configured to allow the drilling fluid to flow out of the first line. The method 300 further includes, at step 306, determining, by a controller operatively connected to the first pressure sensor, the second pressure sensor, the first entrance valve, and the first auto clean valve, that a difference between the second pressure and the first pressure is above a predetermined threshold value. At step 308, the controller at least partially opens a second entrance valve configured to allow the drilling fluid to flow into a second line, and step 310 the controller causes to close the first entrance valve to stop the drilling fluid from entering the first line. The method also includes, at step 312, the controller at least partially opening the first auto clean valve to divert the drilling fluid in the first line to an auto clean pump operatively connected to the first auto clean valve via an auto clean line for removal of unwanted material from the drilling fluid. The method may also include receiving, by the auto clean pump, the drilling fluid from the first line to remove unwanted material from the drilling fluid.

In one example embodiment, the method may include providing a third line comprising two or more valves configured to control flow of the drilling fluid into and out of the third line, and two or more auto clean valve configured to allow the drilling fluid to flow out of the third line. The method may also include connecting the auto clean pump to the two or more auto clean valves via an auto clean line, wherein the auto clean pump configured to receive the drilling fluid from the third line and remove unwanted material from the drilling fluid. The method may additionally include providing a third pressure sensor configured to measure a third pressure of the drilling fluid in the second line at an entrance point, providing a fourth pressure sensor configured to measure a fourth pressure of the drilling fluid in the second line at an exit point, and connecting the controller to the third pressure sensor, the fourth pressure sensor, the two or more valves of the third line. In this example embodiment, the controller may be configured to determine the difference between the third pressure and the fourth pressure is above the predetermined threshold value, at least partially open an entrance valve of the third line to divert drilling fluid intake from the second line to the third line, and close the second entrance valve to stop the drilling fluid from entering the second line. Alternatively, the method may include bypassing the auto cleaning system via a bypass line controlled by a third valve connected to the controller.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "operatively connecting" and its conjugated forms means to complete any type of required junction, including electrical, mechanical or fluid, to form a connection between two or more previously non-joined objects. If a first component is operatively connected to a second component, the connection can occur either directly or through a common connector. "Optionally" and its various forms means that the subsequently described event or circumstance may or may not occur. The description includes instances where the event or circumstance occurs and instances where it does not occur.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method has been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. An auto cleaning system for cleaning a drilling fluid in a drilling operation, the auto cleaning system comprising:
   a first line comprising a first entrance valve configured to allow the drilling fluid to flow into the first line, a first pressure sensor configured to measure a first pressure of the drilling fluid in the first line at an entrance point, a second pressure sensor configured to measure a second pressure of the drilling fluid in the first line at an exit point, and a first auto clean valve configured to allow the drilling fluid to flow out of the first line;
   a second line comprising a second entrance valve configured to allow the drilling fluid to flow into the second line, and a second auto clean valve configured to allow the drilling fluid to flow out of the second line;
   an auto clean pump operatively connected to the first auto clean valve and the second auto clean valve via an auto clean line, the auto clean pump configured to receive the drilling fluid from the first line or the second line and remove unwanted material from the drilling fluid; and
   a controller operatively connected at least to the first entrance valve, the first pressure sensor, the second pressure sensor, the first auto clean valve, the second entrance valve, the second auto clean valve, and the auto clean pump, wherein the controller is configured to:
      determine the difference between the second pressure and the first pressure is above a predetermined threshold value;
      at least partially open the second entrance valve to divert drilling fluid intake from the first line to the second line; and
      close the first entrance valve to stop the drilling fluid from entering the first line.

2. The auto cleaning system of claim 1, wherein the controller is further configured to at least partially open the first auto clean valve to divert the drilling fluid in the first line to the auto clean pump for removal of unwanted material from the drilling fluid.

3. The auto cleaning system of claim 1, further comprising:
   a third line comprising two or more valves configured to control flow of the drilling fluid into and out of the third line, and two or more auto clean valve configured to allow the drilling fluid to flow out of the third line, wherein the auto clean pump is operatively connected to the two or more auto clean valves via an auto clean line, the auto clean pump configured to receive the drilling fluid from the third line and remove unwanted material from the drilling fluid.

4. The auto cleaning system of claim 3, wherein the second line further comprises a third pressure sensor configured to measure a third pressure of the drilling fluid in the second line at an entrance point, and a fourth pressure sensor configured to measure a fourth pressure of the drilling fluid in the second line at an exit point, wherein the controller is operatively connected to the third pressure sensor, the fourth pressure sensor, the two or more valves of the third line, wherein the controller is configured to:

determine the difference between the third pressure and the fourth pressure is above the predetermined threshold value;

at least partially open an entrance valve of the third line to divert drilling fluid intake from the second line to the third line; and close the second entrance valve to stop the drilling fluid from entering the second line.

5. The auto cleaning system of claim 1, wherein the first entrance valve and the second entrance valve comprise a High Closing Ratio or Hydraulic Control Remote (HCR) valve.

6. The auto cleaning system of claim 1, further comprising:

a bypass line controlled by a dedicated bypass valve connected to the controller, the dedicated bypass valve configured to allow the drilling fluid to bypass the auto cleaning system.

7. The auto cleaning system of claim 1, wherein the unwanted material comprises at least one of debris and formation pebbles.

8. The auto cleaning system of claim 4, further comprising:

a human machine interface operatively connected to the controller for displaying an alert message when the drilling fluid is switched from the first line to the second line, and receiving an instruction from an operator.

9. The auto cleaning system of claim 1, wherein the auto cleaning system is installed between a mud pump and a standpipe of the drilling rig.

10. The auto cleaning system of claim 1, wherein the controller is further configured to at least partially open the first auto clean valve to divert the drilling fluid in the first line to the auto clean pump for removal of unwanted material from the drilling fluid.

11. A method for cleaning a drilling fluid in a drilling operation using an auto cleaning system, the method comprising:

measuring, by a first pressure sensor installed on a first line, a first pressure of the drilling fluid at a first point;

measuring, by a second pressure sensor installed on the first line, a second pressure of the drilling fluid at a second point, the first line having a first entrance valve configured to allow the drilling fluid to flow into the first line, and a first auto clean valve configured to allow the drilling fluid to flow out of the first line;

determining, by a controller operatively connected to the first pressure sensor, the second pressure sensor, the first entrance valve, and the first auto clean valve, that a difference between the second pressure and the first pressure is above a predetermined threshold value;

at least partially opening a second entrance valve configured to allow the drilling fluid to flow into a second line; and closing, by the controller, the first entrance valve to stop the drilling fluid from entering the first line.

12. The method of claim 11, further comprising:

the controller at least partially opening the first auto clean valve to divert the drilling fluid in the first line to an auto clean pump operatively connected to the first auto clean valve via an auto clean line for removal of unwanted material from the drilling fluid.

13. The method of claim 12, further comprising:

receiving, by the auto clean pump, the drilling fluid from the first line to remove unwanted material from the drilling fluid.

14. The method of claim 11, further comprising:

providing a third line comprising two or more valves configured to control flow of the drilling fluid into and out of the third line, and two or more auto clean valve configured to allow the drilling fluid to flow out of the third line;

connecting the auto clean pump to the two or more auto clean valves via an auto clean line, wherein the auto clean pump configured to receive the drilling fluid from the third line and remove unwanted material from the drilling fluid.

15. The method of claim 14, further comprising:

providing a third pressure sensor configured to measure a third pressure of the drilling fluid in the second line at an entrance point;

providing a fourth pressure sensor configured to measure a fourth pressure of the drilling fluid in the second line at an exit point;

connecting the controller to the third pressure sensor, the fourth pressure sensor, the two or more valves of the third line, wherein the controller is configured to:

determine the difference between the third pressure and the fourth pressure is above the predetermined threshold value;

at least partially open an entrance valve of the third line to divert drilling fluid intake from the second line to the third line; and close the second entrance valve to stop the drilling fluid from entering the second line.

16. The method of claim 11, wherein the first entrance valve and the second entrance valve comprise a High Closing Ratio or Hydraulic Control Remote (HCR) valve.

17. The method of claim 11, further comprising:

bypassing the auto cleaning system via a bypass line controlled by a third valve connected to the controller.

18. The method of claim 11, further comprising:

displaying an alert message on a human machine interface operatively connected to the controller, and receiving an instruction from an operator.

19. The method of claim 11, further comprising:

installing the auto cleaning system between a mud pump and a standpipe of the drilling rig.

20. An auto cleaning system for cleaning a drilling fluid in a drilling operation, the auto cleaning system comprising:

a first line comprising a first entrance valve configured to allow the drilling fluid to flow into the first line, a first pressure sensor configured to measure a first pressure of the drilling fluid in the first line at a first point, a second pressure sensor configured to measure a second pressure of the drilling fluid in the first line at a second point, and a first auto clean valve configured to allow the drilling fluid to flow out of the first line;

a second line comprising a second entrance valve configured to allow the drilling fluid to flow into the second line, and a second auto clean valve configured to allow the drilling fluid to flow out of the second line;

an auto clean pump operatively connected to the first auto clean valve and the second auto clean valve via an auto clean line, the auto clean pump configured to receive the drilling fluid from the first line or the second line and remove unwanted material from the drilling fluid; and a controller operatively connected at least to the first entrance valve, the first pressure sensor, the second pressure sensor, the first auto clean valve, the second entrance valve, the second auto clean valve, and the auto clean pump, wherein the controller is configured to:

determine the difference between the second pressure and the first pressure is above a predetermined threshold value;
at least partially open the second entrance valve to divert drilling fluid intake from the first line to the second line; and
close the first entrance valve to stop the drilling fluid from entering the first line.

\* \* \* \* \*